UNITED STATES PATENT OFFICE.

HENRY A. DANIELS, OF YONKERS, NEW YORK.

ARTIFICIAL STONE.

SPECIFICATION forming part of Letters Patent No. 346,731, dated August 3, 1886.

Application filed January 15, 1886. Serial No. 188,675. (No specimens.)

*To all whom it may concern:*

Be it known that I, HENRY A. DANIELS, a citizen of the United States, and a resident of Yonkers, in the county of Westchester and State of New York, have invented certain new and useful Improvements in Artificial Stone, of which the following is a specification.

In separate applications for Letters Patent I have described artificial stones made from compositions including sand and cement and a binding material—as glue in solution—and a suitable coloring agent; and my invention consists in the combination, with the said ingredients, of alum and, when a coloring agent is employed, of nut-galls. When the composition is to be used for inside work, or where the stone is not to be exposed, the glue alone may be used as a binding agent, its presence serving to impart greater density and hardness to the material; but when the stone is to be employed in exposed situations the glue is liable to be dissolved, and I therefore combine with the other ingredients a proportion of alum, which has the effect of rendering the glue insoluble, and greatly improves the composition, rendering it harder, more durable, and more like the natural stone. By the addition of nut-galls, when coloring material is employed, or by adding gallic acid in any shape, the colors are so set that they will not be so liable to be altered by exposure to the light and atmosphere as would otherwise result. In some instances I add pearlash or other alkali to the composition, which has the effect of partially dissolving the silica, and I have found that the addition of alum in connection with the pearlash tends to impart a better crystalline character to the stone.

While the materials may be employed in different proportions, I prefer to use, say, ten pounds of sand and five of cement, and to dissolve the glue, pearlash, and alum in water, using one-quarter of a pound of each to a gallon of water, and to mix the coloring material—as indigo, cochineal, ocher, &c.—with the cement, and to then add the solution to the dry material until a paste of proper consistency is formed.

Without limiting myself to the precise proportions of ingredients set forth, I claim—

1. An artificial-stone composition consisting of sand, cement, glue, pearlash, and alum, substantially as described.

2. The combination, in an artificial stone, of sand, cement, a coloring material, and gallic acid, for the purpose set forth.

In testimony whereof I have signed my name to this specification in the presence of two subscribing witnesses.

HENRY A. DANIELS.

Witnesses:
HARRY M. DICKINSON,
H. P. STAMFORD.